(12) United States Patent
Yamamoto

(10) Patent No.: US 10,407,129 B2
(45) Date of Patent: Sep. 10, 2019

(54) GEAR AND BICYCLE GEAR CHANGE MECHANISM INCLUDING GEAR

(71) Applicant: Shimano Inc., Sakai, Osaka (JP)

(72) Inventor: Takashi Yamamoto, Osaka (JP)

(73) Assignee: Shimano Inc., Osaka (JP)

( * ) Notice: Subject to any disclaimer, the term of this patent is extended or adjusted under 35 U.S.C. 154(b) by 157 days.

(21) Appl. No.: 15/379,458

(22) Filed: Dec. 14, 2016

(65) Prior Publication Data

US 2017/0183061 A1 Jun. 29, 2017

(30) Foreign Application Priority Data

Dec. 28, 2015 (JP) .................................. 2015-256333

(51) Int. Cl.
*F16H 3/66* (2006.01)
*B62M 11/14* (2006.01)
(Continued)

(52) U.S. Cl.
CPC ............ *B62M 11/145* (2013.01); *B62M 6/55* (2013.01); *B62M 9/02* (2013.01); *B62M 11/06* (2013.01); *B62M 11/16* (2013.01); *B62M 11/18* (2013.01); *F16H 37/02* (2013.01); *F16H 55/08* (2013.01); *F16H 57/08* (2013.01); *F16H 3/66* (2013.01); *F16H 2200/006* (2013.01); *F16H 2200/0052* (2013.01); *F16H 2200/0073* (2013.01);
(Continued)

(58) Field of Classification Search
CPC ...... B62M 9/121; B62M 9/00; B62M 11/145; B62M 11/18; B62M 6/55; B62M 11/06; B62M 9/02; B62M 11/16; B60B 27/047; F16H 55/16; F16H 1/06; F16H 55/08; F16H 57/08; F16H 37/02; F16H 2200/2046; F16H 2200/2084; F16H 2200/2069; F16H 2200/2007; F16H 2200/0073; F16H 2200/0052; F16H 3/66; F16H 2200/201; F16H 2200/006
USPC .................................. 474/148; 74/413; 475/4
See application file for complete search history.

(56) References Cited

U.S. PATENT DOCUMENTS 2,585,971 A * 2/1952 Sloane ...................... F16H 1/04
74/393
3,817,117 A * 6/1974 Kita ........................ F04C 2/084
74/462
(Continued)

FOREIGN PATENT DOCUMENTS

CN 2387027 Y 7/2000
CN 102762441 A 10/2012
(Continued)

*Primary Examiner* — David J Hlavka
(74) *Attorney, Agent, or Firm* — Global IP Counselors, LLP

(57) ABSTRACT

A bicycle gear change mechanism includes a first gear including first teeth and a second gear including second teeth. Each of the first teeth includes a first surface and a second surface. The first surface defines a first pressure angle. The second surface defines a second pressure angle. The first pressure angle differs from the second pressure angle. Each of the second teeth includes a third surface and a fourth surface. The third surface defines a third pressure angle. The fourth surface defines a fourth pressure angle. The third pressure angle differs from the fourth pressure angle. The second gear engages the first gear.

21 Claims, 10 Drawing Sheets

(51) Int. Cl.

| | |
|---|---|
| *B62M 6/55* | (2010.01) |
| *B62M 9/02* | (2006.01) |
| *B62M 11/06* | (2006.01) |
| *B62M 11/16* | (2006.01) |
| *F16H 37/02* | (2006.01) |
| *F16H 57/08* | (2006.01) |
| *B62M 11/18* | (2006.01) |
| *F16H 55/08* | (2006.01) |

(52) U.S. Cl.
CPC ............ *F16H 2200/201* (2013.01); *F16H 2200/2007* (2013.01); *F16H 2200/2046* (2013.01); *F16H 2200/2069* (2013.01); *F16H 2200/2084* (2013.01)

(56) References Cited

U.S. PATENT DOCUMENTS

| | | | | |
|---|---|---|---|---|
| 3,881,365 A | * | 5/1975 | Hardy | F16H 55/08 74/462 |
| 4,276,785 A | * | 7/1981 | Rouverol | F16H 55/0806 74/457 |
| 4,653,340 A | * | 3/1987 | LaBate | F16H 1/003 74/437 |
| 4,936,597 A | * | 6/1990 | Hartmann | B62M 11/145 280/231 |
| 6,282,502 B1 | * | 8/2001 | Sundaresan | F16H 55/08 700/98 |
| 9,550,243 B2 | * | 1/2017 | Ohmi | B23F 17/005 |
| 2003/0130085 A1 | | 7/2003 | Matsuo et al. | |
| 2013/0049549 A1 | * | 2/2013 | Folmli | B62M 6/65 310/67 A |
| 2013/0174231 A1 | * | 7/2013 | Stavropoulos | H04L 63/0428 726/5 |
| 2014/0366668 A1 | * | 12/2014 | Kajiwara | F16H 55/0806 74/457 |
| 2016/0245388 A1 | * | 8/2016 | Nagata | F16H 55/08 |
| 2017/0167589 A1 | * | 6/2017 | Berlinger, Jr. | F16H 1/06 |
| 2018/0073618 A1 | * | 3/2018 | Narumiya | F16H 55/08 |

FOREIGN PATENT DOCUMENTS

| | | |
|---|---|---|
| JP | 2003-200878 A | 7/2003 |
| JP | 2014-524555 A | 9/2014 |
| JP | 3194818 U | 12/2014 |
| WO | 2011/067633 A1 | 6/2011 |

\* cited by examiner

|  | 1st Gear | 2nd Gear | 3rd Gear | 4th Gear | 5th Gear | 6th Gear | 7th Gear | 8th Gear |
|---|---|---|---|---|---|---|---|---|
| 11th Gear 98 | ○ | ○ | ○ | ○ |  |  |  |  |
| 2nd Stepped Gear 90 | ○ | ○ | ○ | ○ |  |  |  |  |
| 9th Gear 96 | ○ | ○ | ○ | ○ |  |  |  |  |
| 2nd Planetary Pin 104 | ○ | ○ | ○ | ○ |  |  |  |  |
| Carrier 100 | ○ | ○ | ○ | ○ | ○ | ○ | ○ | ○ |
| 1st Planetary Pin 102 |  | ○ | ○ | ○ |  | ○ | ○ | ○ |
| 6th Gear 82 |  | ○ |  |  |  | ○ |  |  |
| 2nd Gear 74 |  |  | ○ |  |  |  | ○ |  |
| 7th Gear 86 |  |  |  | ○ |  |  |  | ○ |
| 1st Stepped Gear 60 |  | ○ | ○ | ○ |  | ○ | ○ | ○ |
| 4th Gear 78 |  | ○ | ○ | ○ |  | ○ | ○ | ○ |

Fig.7

GEAR AND BICYCLE GEAR CHANGE MECHANISM INCLUDING GEAR

CROSS-REFERENCE TO RELATED APPLICATIONS

This application claims priority to Japanese Patent Application No. 2015-256333, filed on Dec. 28, 2015. The entire disclosure of Japanese Patent Application No. 2015-256333 is hereby incorporated herein by reference.

BACKGROUND

Field of the Invention

The present disclosure relates to gears and a bicycle gear change mechanism that includes gears.

Background Information

A known bicycle component includes a gear change mechanism. Japanese Registered Utility Model No. 3194818 describes a bicycle drive unit that includes a gear change mechanism provided with a planetary gear mechanism.

SUMMARY

Japanese Registered Utility Model No. 3194818 does not particularly address miniaturization of the gear change mechanism. Thus, there is room for improvement to miniaturize the gear change mechanism of Japanese Registered Utility Model No. 3194818.

It is an object of the present disclosure to provide gears that allow for miniaturization of a bicycle component and a bicycle gear change mechanism that includes the gears.

In a first aspect of the present disclosure, a bicycle gear change mechanism includes a first gear including first teeth and a second gear including second teeth. Each of the first teeth includes a first surface and a second surface. The first surface defines a first pressure angle. The second surface defines a second pressure angle. The first pressure angle differs from the second pressure angle. Each of the second teeth includes a third surface and a fourth surface. The third surface defines a third pressure angle. The fourth surface defines a fourth pressure angle. The third pressure angle differs from the fourth pressure angle. The second gear is engaged with the first gear.

In a second aspect of the present disclosure, in a bicycle gear change mechanism according to the previous aspect, the first pressure angle is larger than the second pressure angle, the third pressure angle is larger than the fourth pressure angle, and the first gear is engaged with the second gear so that the first surface contacts the third surface.

In a third aspect of the present disclosure, in a bicycle gear change mechanism according to any of the previous aspects, the first gear and the second gear are spur gears.

In a fourth aspect of the present disclosure, a bicycle gear change mechanism according to any of the previous aspects further includes a third gear including third teeth and a fourth gear including fourth teeth. Each of the third teeth includes a fifth surface and a sixth surface. The fifth surface defines a fifth pressure angle. The sixth surface defines a sixth pressure angle. The fifth pressure angle is equal to the sixth pressure angle. The third gear is configured to rotate integrally with the first gear. Each of the fourth teeth includes a seventh surface and an eighth surface. The seventh surface defines a seventh pressure angle. The eighth surface defines an eighth pressure angle. The seventh pressure angle is equal to the eighth pressure angle. The fourth gear is engaged with the third gear.

In a fifth aspect of the present disclosure, in a bicycle gear change mechanism according to any of the previous aspects, the first gear is formed integrally with the third gear.

In a sixth aspect of the present disclosure, in a bicycle gear change mechanism according to any of the previous aspects, the first teeth of the first gear differ in number from the third teeth of the third gear.

In a seventh aspect of the present disclosure, a bicycle gear change mechanism according to any of the previous aspects further includes a fifth gear including fifth teeth and a sixth gear including sixth teeth. Each of the fifth teeth includes a ninth surface and a tenth surface. The ninth surface defines a ninth pressure angle. The tenth surface defines a tenth pressure angle. The ninth pressure angle differs from the tenth pressure angle. The fifth gear is configured to rotate integrally with the first gear. Each of sixth teeth includes an eleventh surface and a twelfth surface. The eleventh surface defines an eleventh pressure angle. The twelfth surface defines a twelfth pressure angle. The eleventh surface differs from the twelfth pressure angle. The sixth gear is engaged with the fifth gear.

In an eighth aspect of the present disclosure, in a bicycle gear change mechanism according to any of the previous aspects, the ninth pressure angle is larger than the tenth pressure angle, the eleventh pressure angle is larger than the twelfth pressure angle, and the fifth gear engages with the sixth gear so that the ninth surface contacts the eleventh surface.

In a ninth aspect of the present disclosure, in a bicycle gear change mechanism according to any of the previous aspects, the first gear is formed integrally with the fifth gear.

In a tenth aspect of the present disclosure, in a bicycle gear change mechanism according to any of the previous aspects, the first teeth of the first gear differ in number from the fifth teeth of the fifth gear.

In an eleventh aspect of the present disclosure, in a bicycle gear change mechanism according to any of the previous aspects, the third teeth of the third gear differ in number from the fifth teeth of the fifth gear.

In a twelfth aspect of the present disclosure, in a bicycle gear change mechanism according to any of the previous aspects, the first gear and the second gear are included in a first planetary gear mechanism, the first gear forms a first planetary gear, and the second gear forms one of a first sun gear and a first ring gear.

In a thirteenth aspect of the present disclosure, in a bicycle gear change mechanism according to any of the previous aspects, the third gear and the fourth gear are included in the first planetary gear mechanism, the third gear forms a second planetary gear, and the fourth gear forms the other one of the first sun gear and the first ring gear.

In a fourteenth aspect of the present disclosure, in a bicycle gear change mechanism according to any of the previous aspects, the fifth gear and the sixth gear are included in the first planetary gear mechanism, the fifth gear forms a third planetary gear, and the sixth gear forms one of a second sun gear and a second ring gear.

In a fifteenth aspect of the present disclosure, a bicycle gear change mechanism according to any of the previous aspects further includes a seventh gear including seventh teeth, a support axle that supports the second gear and the seventh gear, and a control mechanism that controls rotation of the second gear and the seventh gear relative to the support axle. Each of seventh teeth includes a thirteenth surface and a fourteenth surface. The thirteenth surface defines a thirteenth pressure angle. The fourteenth surface defines a fourteenth pressure angle. The thirteenth pressure angle is equal to the fourteenth pressure angle. The seventh gear engages with the third gear. The second gear forms a first sun gear. The seventh gear is included in the first planetary gear mechanism and forms a third sun gear.

In a sixteenth aspect of the present disclosure, a bicycle gear change mechanism according to any of the previous aspects further includes a second planetary gear mechanism coupled to the first planetary gear mechanism.

In a seventeenth aspect of the present disclosure, in a bicycle gear change mechanism according to any of the previous aspects, the first pressure angle and the third pressure angle are each twenty degrees or greater, and the second pressure angle and the fourth pressure angle are each less than twenty degrees.

In an eighteenth aspect of the present disclosure, in a bicycle gear change mechanism according to any of the previous aspects, the first pressure angle and the third pressure angle are each thirty degrees or greater, and the second pressure angle and the fourth pressure angle are each less than seventeen degrees.

In a nineteenth aspect of the present disclosure, in a bicycle gear change mechanism according to any of the previous aspects, the first gear and the second gear change a speed of rotation transmitted from at least one of a crank axle and a motor.

In a twentieth aspect of the present disclosure, a bicycle gear change mechanism according to any of the previous aspects forms a hub gear arranged at a hub of a rear wheel.

In a twenty-first aspect of the present disclosure, a gear includes a first gear including first teeth and a third gear including third teeth. Each of the first teeth includes a first surface and a second surface. The first surface defines a first pressure angle. The second surface defines a second pressure angle. The first pressure angle differs from the second pressure angle. Each of third teeth includes a fifth surface and a sixth surface. The fifth surface defines a fifth pressure angle. The sixth surface defines a sixth pressure angle. The fifth pressure angle is equal to the sixth pressure angle. The third gear is formed integrally with the first gear.

In a twenty-second aspect of the present disclosure, in the gear according to the previous aspect, the first teeth of the first gear differ in number from the third teeth of the third gear.

The above bicycle gear change mechanism and the above gears that facilitate miniaturization of a bicycle component.

BRIEF DESCRIPTION OF THE DRAWINGS

Referring now to the attached drawings which form a part of this original disclosure.

FIG. 7 is a chart of the relationship between each element in FIG. 1 and each gear.

DESCRIPTION OF THE EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
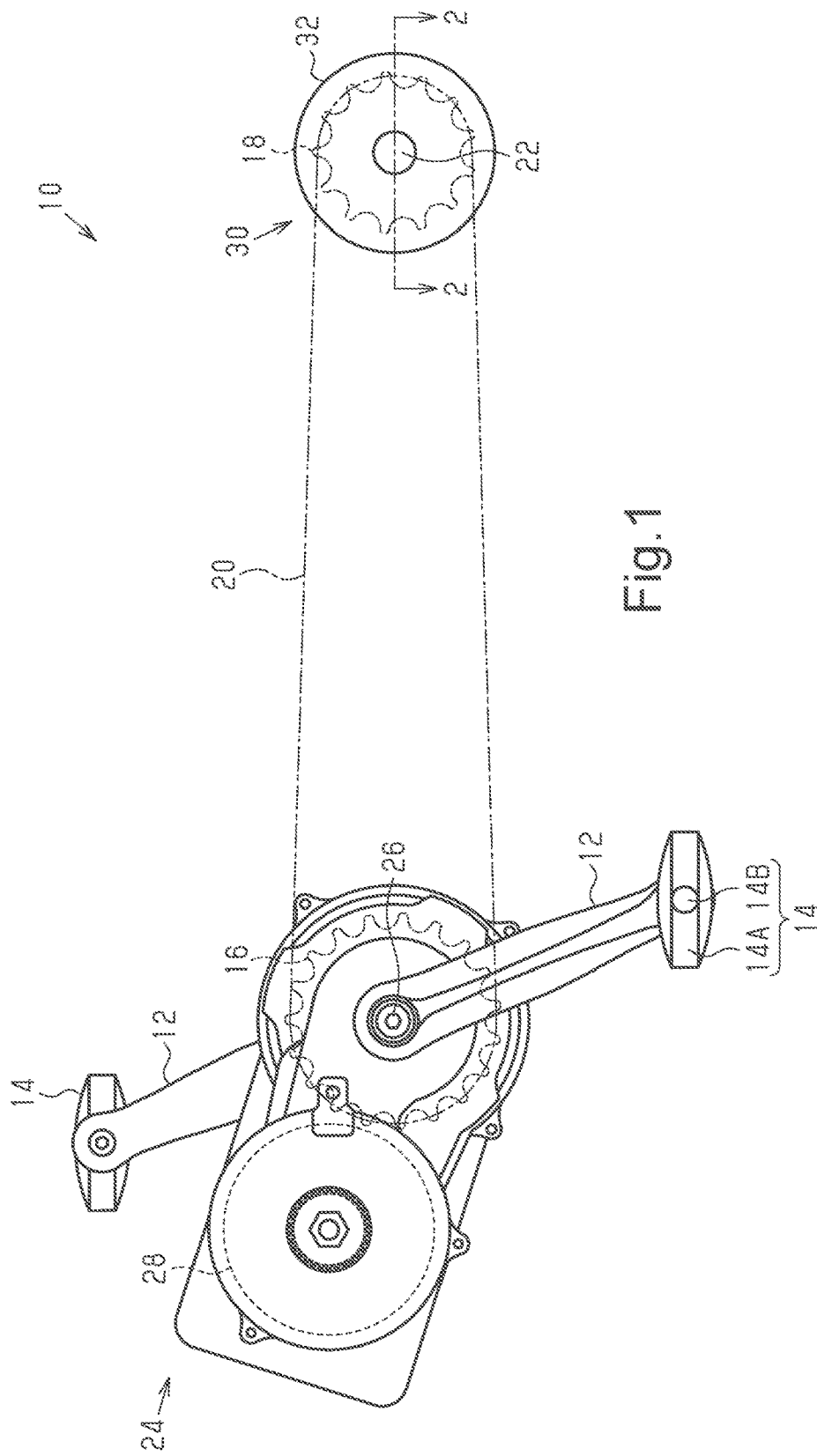
FIG. 1 is a side elevational view of a drive train portion of a motor assisted bicycle (i.e., a pedelec) that includes a bicycle gear change mechanism in accordance with a first embodiment.

Referring initially to FIG. 1, a side elevational view of a drive train portion of a motor assisted bicycle (i.e., a pedelec) 10 is illustrated that is equipped with a bicycle gear change mechanism 36. The motor assisted bicycle 10 will hereafter be referred to as the "bicycle 10". The bicycle gear change mechanism 36 will hereafter be referred to as "gear change mechanism 36". The bicycle 10 includes two crank arms 12, two pedals 14, a front sprocket 16, a rear sprocket 18, a chain 20, a drive unit 24, a crank axle 26 and a hub 30. The hub 30 is one example of a bicycle component that includes the gear change mechanism 36. The hub 30 includes a support axle 22. The hub 30 is coupled to the rear wheel (not shown) of the bicycle 10. The support axle 22 is a hub axle and forms the axle of the rear wheel of the bicycle 10. The drive unit 24 includes a motor 28.

The bicycle 10 includes a frame that supports the drive unit 24. The drive unit 24 supports the crank arms 12. The crank arms 12 are rotatable relative to the drive unit 24 and the frame. The crank arms 12 support the pedals 14. Each of the pedals 14 includes a pedal body 14A and a pedal shaft 14B. The pedal shaft 14B is fixed to the corresponding crank arm 12. The pedal body 14A is rotatable about the pedal shaft 14B relative to the crank arm 12. The front sprocket 16 is coupled to the crank axle 26. The front sprocket 16 can be directly coupled to the crank axle 26. Alternatively, the front sprocket 16 can be, for example, coupled to the crank axle 26 by another member such as a one-way clutch and a sleeve. The crank axle 26 is coaxial with the front sprocket 16. The hub 30 supports the rear sprocket 18. The rear sprocket 18 is rotatable about the axis of the support axle 22. The chain 20 runs around the front sprocket 16 and the rear sprocket 18.

When human-driven force is applied to the pedals 14, the crank arms 12 rotate integrally with the crank axle 26. The rotation of crank axle 26 rotates the rear wheel of the bicycle 10 with the front sprocket 16, the chain 20, the rear sprocket 18, and the hub 30. The drive unit 24 transmits rotation of the motor 28 to the hub 30 through the front sprocket 16 and the chain 20.

Figure 2:
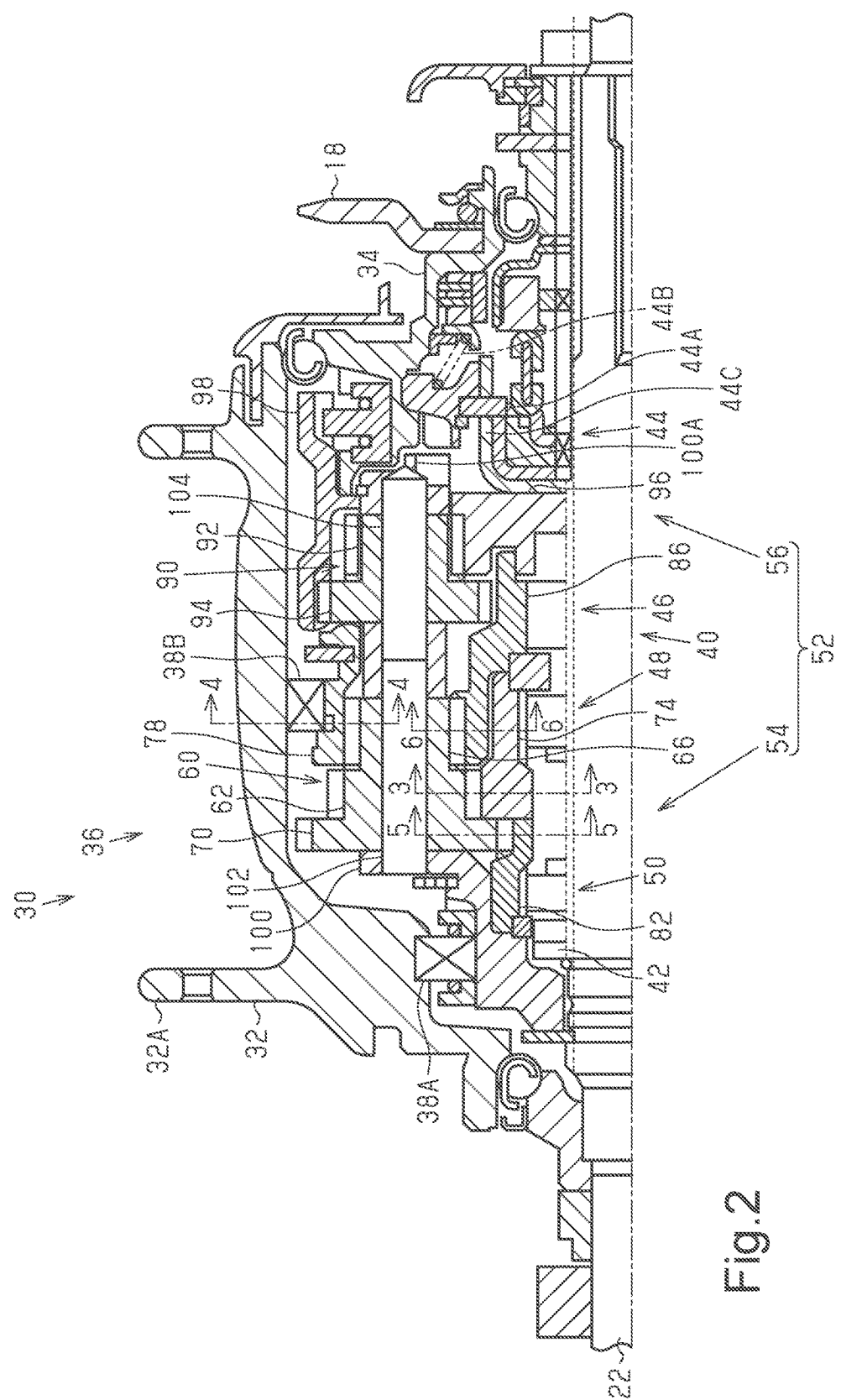
FIG. 2 is a half cross-sectional view of the bicycle gear change mechanism (e.g., a part of a hub) taken along section line 2-2 in FIG. 1.

FIG. 2 is a cross-sectional view showing half of the hub 30 and die rear sprocket 18 taken along section line 2-2 in FIG. 1. The hub 30 includes a hub shell 32, an input portion 34 and the gear change mechanism 36. The gear change mechanism 36 forms a hub gear included in the hub 30. The gear change mechanism 36 includes the support axle 22, a control mechanism 40 and a planetary gear mechanism 52. The hub shell 32 includes output portions 32A. The output portions 32A are formed by a plurality flanges that are spaced apart from each other on the hub shell 32 in the axial direction of the support axle 22 and coupled to spokes (not shown). The hub shell 32 accommodates at least portions of the planetary gear mechanism 52 and the control mechanism 40. The control mechanism 40 selectively restricts rotation of elements of the planetary gear mechanism 52.

The planetary gear mechanism 52 includes a first planetary gear mechanism 54 and a second planetary gear mechanism 56. The second planetary gear mechanism 56 is coupled to the first planetary gear mechanism 54. The support axle 22 supports the input portion 34. The input portion 34 is rotatable about the axis of the support axle 22. The rear sprocket 18 is attached to the input portion 34 at one end of the support axle 22 in a removable manner. The planetary gear mechanism 52 changes the speed of rotation received from the input portion 34 and transmits the rotation to the output portions 32A.

The first planetary gear mechanism 54 includes first stepped gears 60, a second gear 74, a fourth gear 78, a sixth gear 82, a seventh gear 86, a carrier 100 and first planetary pins 102. Each of the first stepped gears 60 includes a first gear 62, a third gear 66, and a fifth gear 70. The first gear 62 is formed integrally with the third gear 66 and the fifth gear 70.

The first gear 62 forms a first planetary gear. The third gear 66 forms a second planetary gear. The fifth gear 70 forms a third planetary gear. The first gear 62, the third gear 66 and the fifth gear 70 have different diameters and different numbers of teeth. The diameters of the gears 62, 66 and 70 increase in order from the third gear 66 to the first gear 62 and then the fifth gear 70. The number of teeth of the gears 62, 66 and 70 increases in order from the third gear 66 to the first gear 62 and then the fifth gear 70.

The second gear 74 forms a first sun gear. The sixth gear 82 forms a second sun gear. The seventh gear 86 forms a third sun gear. The fourth gear 78 forms a first ring gear. The diameters of the gears 74, 82 and 86 and the number of teeth in the gears 74, 82 and 86 increase in order from the sixth gear 82 to the second gear 74 and then the seventh gear 86.

The first gear 62 is located at an outer circumference of the second gear 74. The first gear 62 engages with the second gear 74. The third gear 66 is located at an inner circumference of the fourth gear 78. The third gear 66 engages with the fourth gear 78. The third gear 66 is located at an outer circumference of the seventh gear 86. The third gear 66 engages with the seventh gear 86. The fifth gear 70 is located at an outer circumference of the sixth gear 82. The fifth gear 70 engages with the sixth gear 82.

The second planetary gear mechanism 56 includes second stepped gears 90, a ninth gear 96, an eleventh gear 98, the carrier 100, and second planetary pins 104. Each of the second stepped gears 90 includes an eighth gear 92 and a tenth gear 94. The eighth gear 92 and the tenth gear 94 form a planetary gear of the second planetary gear mechanism 56. The ninth gear 96 forms a sun gear of the second planetary gear mechanism 56. The eighth gear 92 is located at an outer circumference of the ninth gear 96. The ninth gear 96 engages with the eighth gear 92. The eleventh gear 98 forms a ring gear of the second planetary gear mechanism 56. The tenth gear 94 is located at an inner circumference of the eleventh gear 98. The eleventh gear 98 engages with the tenth gear 94. The eighth gear 92 has a smaller diameter than the tenth gear 94. The eighth gear 92 has a smaller number of teeth than the tenth gear 94.

The support axle 22 rotationally supports the hub shell 32 and the input portion 34. The input portion 34 rotationally supports the hub shell 32. The support axle 22 supports the second gear 74, the sixth gear 82, the seventh gear 86, and the ninth gear 96. The support axle 22 is coaxial with the gears 74, 82, 86 and 96. The gears 74, 82, 86 and 96 are arranged in a direction extending along the axis of the support axle 22 in the order of the ninth gear 96, the seventh gear 86, the second gear 74, and the sixth gear 82 from the side of the input portion 34. The gears 74, 82 and 86 are rotatable about the axis of the support axle 22. The fourth gear 78 is located at an outer circumference of the first stepped gears 60. The ninth gear 96 is fixed to the support axle 22. The hub 30 includes a first one-way clutch 38A and a second one-way clutch 38B. The first one-way clutch 38A is located between the carrier 100 and the hub shell 32. The second one-way clutch 38B is located between the fourth gear 78 and the hub shell 32. The first one-way clutch 38A and the second one-way clutch 38B can each be of a pawl type or a roller clutch.

Figure 3:
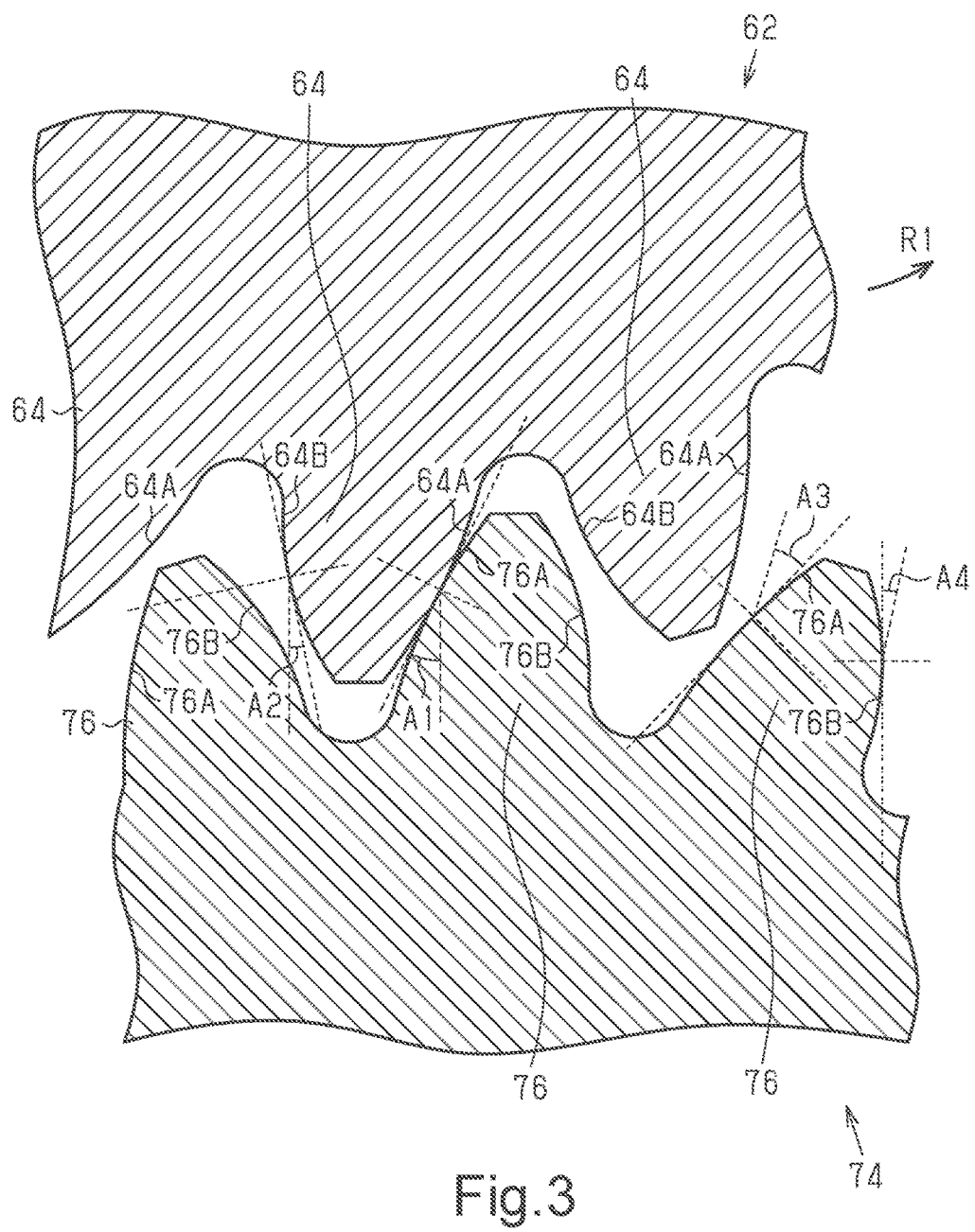
FIG. 3 is an enlarged cross-sectional view of a portion of the bicycle gear change mechanism taken along section line 3-3 in FIG. 2.

FIG. 3 is an enlarged view showing portions of the first gear 62 and the second gear 74 that engage with each other. In one example, the first gear 62 and the second gear 74 are spur gears. The first gear 62 includes first teeth 64. The second gear 74 includes second teeth 76. One of the first teeth 64 engages one of the second teeth 76. The first teeth 64 are asymmetrical about any plane that extends through the rotational axis of the first gear 62. The second teeth 76 are asymmetrical about any plane that extends through the rotational axis of the second gear 74. In the description, an "asymmetrical tooth" can refer to a tooth that is asymmetrical about any plane extending through the rotational axis of the gear such as the first tooth 64 or the second tooth 76 and has two surfaces defining different pressure angles.

Each of the first teeth 64 includes a first surface 64A and a second surface 64B. The first surface 64A defines a first pressure angle A1 at the pitch point. The second surface 64B defines a second pressure angle A2 at the pitch point. The first pressure angle A1 differs from the second pressure angle A2. In one example, the first pressure angle A1 is larger than the second pressure angle A2. Each of the second teeth 76 includes a third surface 76A and a fourth surface 76B. The third surface 76A defines a third pressure angle A3 at the pitch point. The fourth surface 76B defines a fourth pressure angle A4 at the pitch point. The third pressure angle A3 differs from the fourth pressure angle A4. In one example, the third pressure angle A3 is larger than the fourth pressure angle A4.

In one example, the first pressure angle A1 and the third pressure angle A3 are twenty degrees or greater. In one example, the second pressure angle A2 and the fourth pressure angle A4 are less than twenty degrees. In a preferred example, the first pressure angle A1 and the third pressure angle A3 are thirty degrees or greater. In a preferred example, the second pressure angle A2 and the fourth pressure angle A4 are less than seventeen degrees. Preferably, the first pressure angle A1 is equal to the third pressure angle A3. Preferably, the first pressure angle A1 and the third pressure angle A3 are less than fifty degrees. Preferably, the second pressure angle A2 and the fourth pressure angle A4 are ten degrees or greater. The first gear 62 can engage the second gear 74 so that the first surface 64A contacts the second surface 64B. The first surface 64A and the third surface 76A are driving surfaces. The second surface 64B and the fourth surface 76B are non-driving surfaces.

Figure 4:
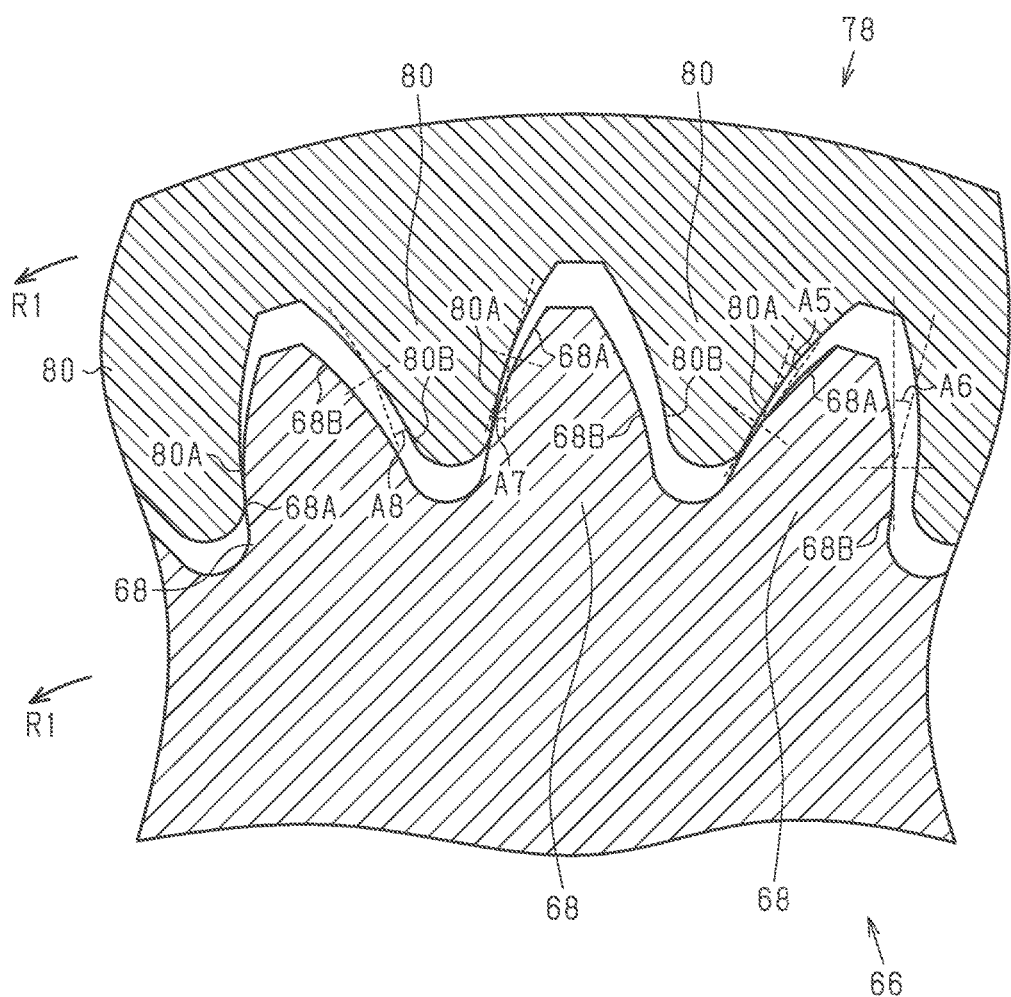
FIG. 4 is an enlarged cross-sectional view of a portion of the bicycle gear change mechanism taken along section line 4-4 in FIG. 2.

FIG. 4 is an enlarged cross-sectional view showing portions of the third gear 66 and the fourth gear 78 that engage with each other. In one example, the third gear 66 and the fourth gear 78 are spur gears. The third gear 66 includes third teeth 68. The fourth gear 78 includes fourth teeth 80. One of the third teeth 68 engages one of the fourth teeth 80. Each of the third teeth 68 includes a fifth surface 68A and a sixth surface 68B. The fifth surface 68A defines a fifth pressure angle A5 at the pitch point. The sixth surface 68B defines a sixth pressure angle A6 at the pitch point. The fifth pressure angle A5 is equal to the sixth pressure angle A6. The third teeth 68 are symmetrical about any plane that extends through the rotational axis of the third gear 66. The fifth surfaces 68A and the sixth surfaces 68B of the third gear 66 are driving surfaces. When the third gear 66 rotates in one direction, the fifth surfaces 68A and the sixth surfaces 68B come in contact with different gears.

The fourth gear 78 includes fourth teeth 80. Each of die fourth teeth 80 includes a seventh surface 80A and an eighth surface 80B. The seventh surface 80A defines a seventh pressure angle A7 at the pitch point. The eighth surface 80B defines an eighth pressure angle A8 at the pitch point. The seventh pressure angle A7 is equal to the eighth pressure angle A8. The fourth teeth 80 are symmetrical about any plane that extends through the rotational axis of the fourth gear 78.

Figure 5:
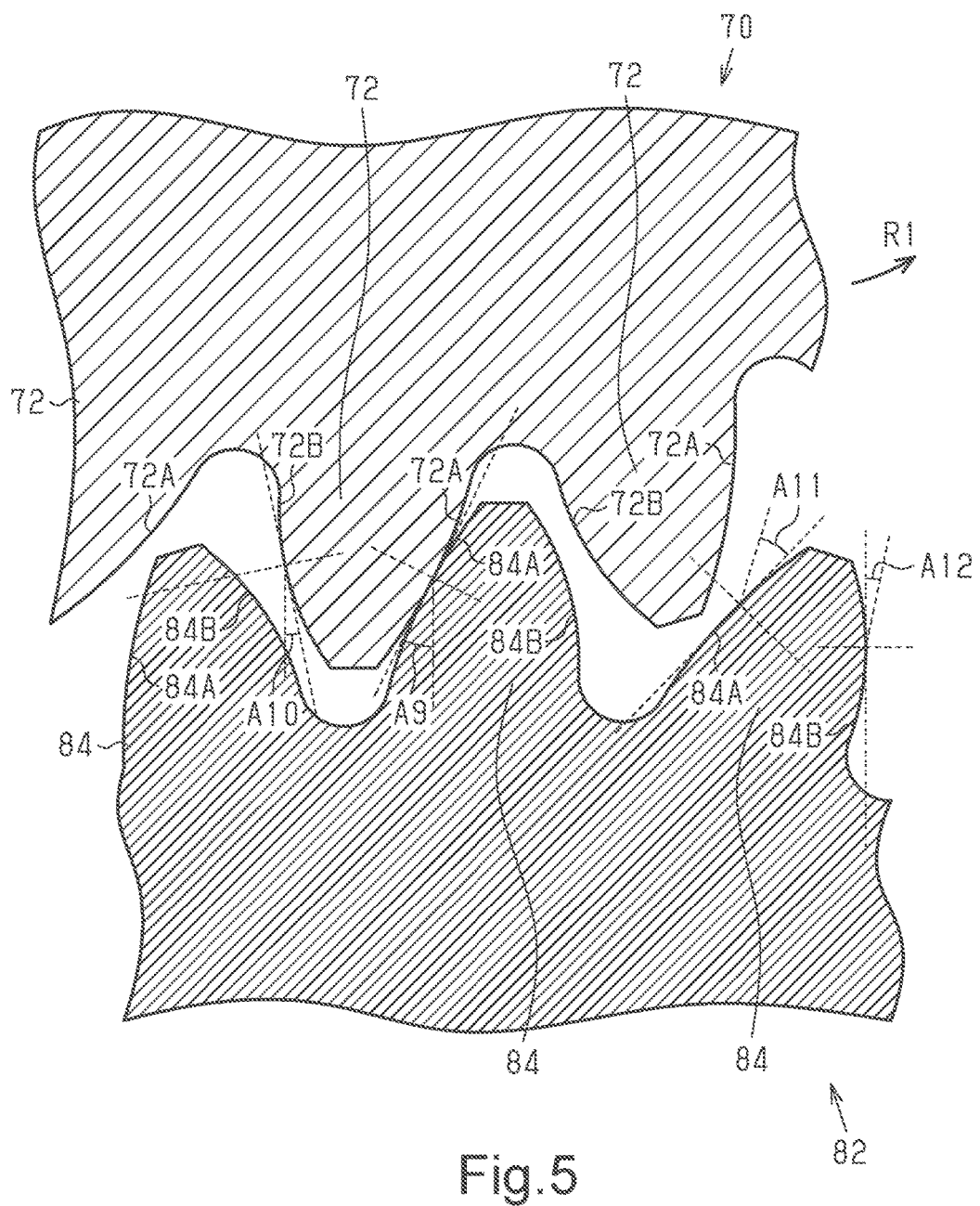
FIG. 5 is an enlarged cross-sectional view of a portion of the bicycle gear change mechanism taken along section line 5-5 in FIG. 2.

FIG. 5 is an enlarged cross-sectional view showing portions of the fifth gear 70 and the sixth gear 82 that engage with each other. In one example, the fifth gear 70 and the sixth gear 82 are spur gears. The fifth gear 70 includes fifth teeth 72. The sixth gear 82 includes sixth teeth 84. One of the fifth teeth 72 engages one of the sixth teeth 84. The fifth teeth 72 are asymmetrical. The sixth teeth 84 are asymmetrical. Each of the fifth teeth 72 includes a ninth surface 72A and a tenth surface 72B. The ninth surface 72A defines a ninth pressure angle A9 at the pitch point. The tenth surface 72B defines a tenth pressure angle A10 at the pitch point. The ninth pressure angle A9 differs from the tenth pressure angle A10, and is larger than the tenth pressure angle A10.

Each of the sixth teeth 84 includes an eleventh surface 84A and a twelfth surface 84B. The eleventh surface 84A defines an eleventh pressure angle A11 at the pitch point. The twelfth surface 84B defines a twelfth pressure angle A12 at the pitch point. The eleventh pressure angle A11 is larger than the twelfth pressure angle A12. In one example, the ninth pressure angle A9 and the eleventh pressure angle A11 are twenty degrees or greater. The tenth pressure angle A10 and the twelfth pressure angle A12 are less than twenty degrees. In a preferred example, the ninth pressure angle A9 and the eleventh pressure angle A11 are thirty degrees or greater. In a preferred example, the tenth pressure angle A10 and the twelfth pressure angle A12 are less than seventeen degrees. Preferably, the ninth pressure angle A9 is equal to the eleventh pressure angle A11. Preferably, the ninth pressure angle A9 and the eleventh pressure angle A11 are less than fifty degrees. Preferably, the tenth pressure angle A10 and the twelfth pressure angle 12A are ten degree or greater. The fifth gear 70 can engage the sixth gear 82 so that the ninth surface 72A contacts the eleventh surface 84A. The ninth surface 72A and the eleventh surface 84A are driving surfaces. The tenth surface 72B and the twelfth surface 84B are non-driving surfaces.

Figure 6:
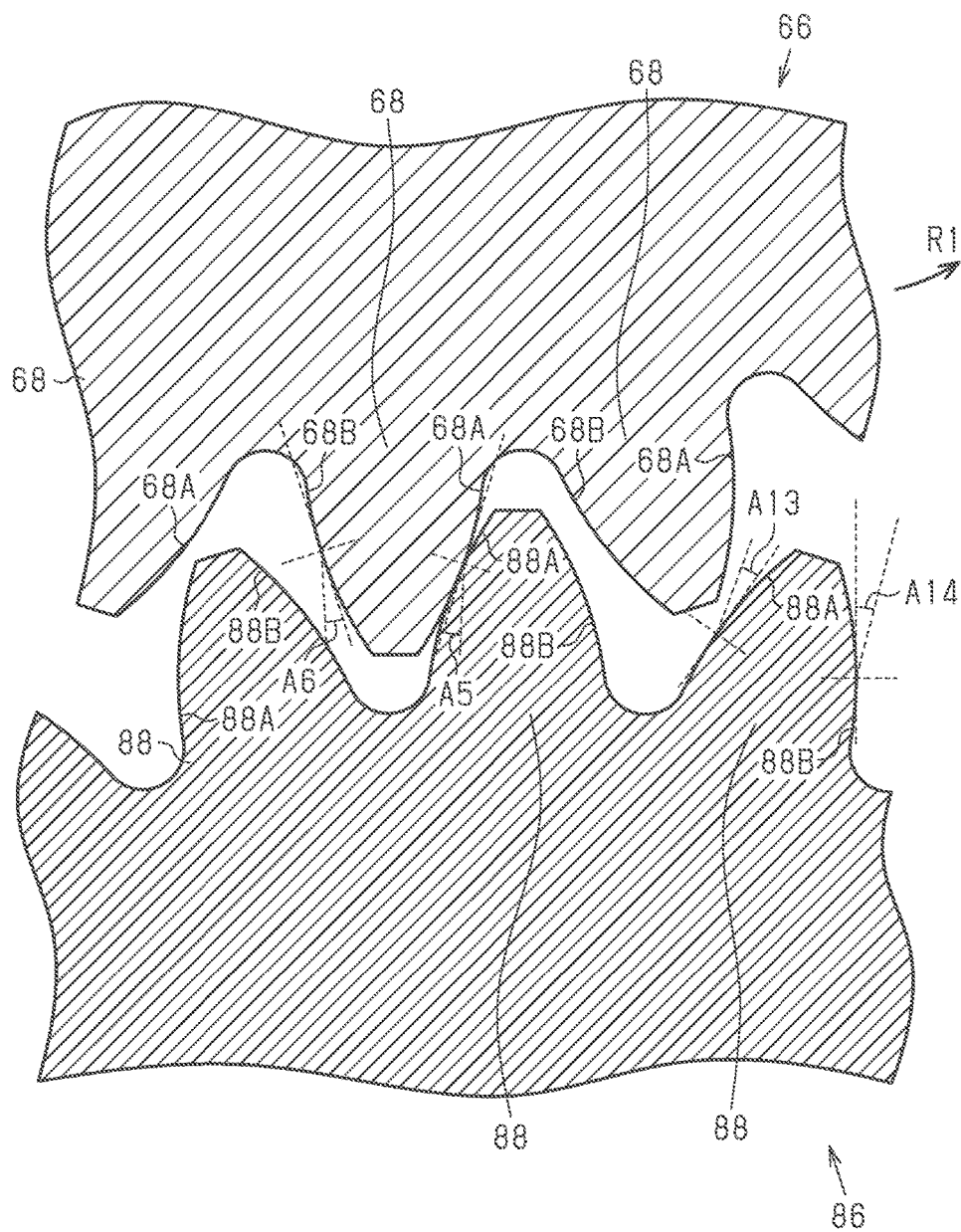
FIG. 6 is an enlarged cross-sectional view of a portion of the bicycle gear change mechanism taken along section line 6-6 in FIG. 2.

FIG. 6 is an enlarged cross-sectional view showing portions of the third gear 66 and the seventh gear 86 that engage with each other. In one example, the seventh gear 86 is a spur gear. The seventh gear 86 includes seventh teeth 88. One of the third teeth 68 engages one of the seventh teeth 88. Each of the seventh teeth 88 includes a thirteenth surface 88A and a fourteenth surface 88B. The thirteenth surface 88A defines a thirteenth pressure angle A13 at the pitch point. The fourteenth surface 88B defines a fourteenth pressure angle A14 at the pitch point. The thirteenth pressure angle A13 is equal to the fourteenth pressure angle A14. The seventh teeth 88 are symmetrical about any plane that extends through the rotational axis of the seventh gear 86.

Referring to FIG. 2, one of the first planetary pins 102 is arranged in each of the first stepped gears 60. The first planetary pin 102 is coaxial with the first stepped gear 60, and extends through the first stepped gear 60. Each of the first planetary pins 102 includes two ends, which are rotationally supported by the carrier 100. The first planetary pin 102 can be rotatable relative to the first stepped gear 60, or fixed to the first stepped gear 60. When the first planetary pin 102 is rotatable relative to the first stepped gear 60, the two ends of the first planetary pin 102 can be fixed to and supported by the carrier 100.

One of the second planetary pins 104 is arranged in each of the second stepped gears 90. The second planetary pin 104 is coaxial with the second stepped gear 90, and extends through the second stepped gear 90. Each of the second planetary pins 104 includes two ends, which are rotationally supported by the carrier 100. The second planetary pin 104 can be rotatable relative to the second stepped gear 90, or fixed to the second stepped gear 90. When the second planetary pin 104 is rotatable relative to the second stepped gear 90, the two ends of the second planetary pin 104 can be fixed to and supported by the carrier 100.

The carrier 100 is coaxial with the support axle 22. The carrier 100 is rotatable about the axis of the support axle 22 integrally with the second planetary pins 104 and the first planetary pins 102. The second stepped gears 90 and the first stepped gears 60 are supported by the carrier 100 with the second planetary pins 104 and the first planetary pins 102. The first planetary gear mechanism 54 and the second planetary gear mechanism 56 share the integrally formed carrier 100. Instead, the first planetary gear mechanism 54 and the second planetary gear mechanism 56 can include separate carriers 100 that are coupled to each other so that the carries 100 rotate integrally with each other.

The control mechanism 40 includes a sleeve 42, a first clutch member 44, a second clutch member 46, a third clutch member 48 and a fourth clutch member 50. The sleeve 42 is supported by the support axle 22. The sleeve 42 is movable about the axis of the support axle 22. The sleeve 42 includes three arms (not shown), which extend along the circumferential surface of the support axle 22, and a sleeve body (not shown), which couples the three arms. The arms are located at positions corresponding to the clutch members 46, 48 and 50. The arms of the sleeve 42 selectively restrict rotation of the seventh gear 86, the second gear 74 and the sixth gear 82 with the clutch members 46, 48 and 50. The sleeve 42 can be connected to an operation unit located on the handlebar by a cable or connected to a gear change motor unit.

The first clutch member 44 includes a clutch ring 44A and a spring 44B. The clutch ring 44A is located adjacent to the carrier 100. The clutch ring 44A is coupled to the input portion 34. The clutch ring 44A rotates integrally with the input portion 34. The input portion 34 is coupled to an inner circumferential portion of the ring gear of the second planetary gear mechanism 56 by the one-way clutch. The spring 44B applies force to the clutch ring 44A so that clutch ring 44A becomes closer to the carrier 100. The clutch ring 44A is movable by the force of the spring 44B. The control mechanism 40 includes a cam member 44C, which rotates in cooperation with the sleeve 42 and restricts the position of the clutch ring 44A in a direction extending along the axis of the support axle 22. The clutch ring 44A is pressed against a cam surface of the cam member 44C by the spring 44B. The carrier 100 includes a spline 100A. When the clutch ring 44A engages with the spline 100A of the carrier 100, the input portion 34 is coupled to the carrier 100, and rotation of the input portion 34 is transmitted to the carrier 100. When the clutch ring 44A is separated from the carrier 100, rotation of the input portion 34 is transmitted to the eleventh gear 98.

The second clutch member 46 is located between an outer circumferential portion of the support axle 22 and an inner circumferential portion of the seventh gear 86. The second clutch member 46 of the control mechanism 40 controls rotation of the seventh gear 86. The second clutch member 46 includes an outer circumferential portion that includes at least one pawl. The inner circumferential portion of the seventh gear 86 includes at least one ratchet tooth. Engagement of the pawl of the second clutch member 46 with the ratchet tooth of the seventh gear 86 restricts rotation of the seventh gear 86. Separation of the pawl of the second clutch member 46 from the seventh gear 86 allows rotation of the seventh gear 86.

The third clutch member 48 is located between the outer circumferential portion of the support axle 22 and an inner circumferential portion of the second gear 74. The third clutch member 48 of the control mechanism 40 controls rotation of the second gear 74. The third clutch member 48 includes an outer circumferential portion that includes at least one pawl. The inner circumferential portion of the second gear 74 includes at least one ratchet tooth. Engagement of the pawl of the third clutch member 48 with the ratchet tooth of the second gear 74 restricts rotation of the second gear 74. Separation of the pawl of the third clutch member 48 from the second gear 74 allows rotation of the second gear 74.

The fourth clutch member 50 is located between the outer circumferential portion of the support axle 22 and an inner circumferential portion of the sixth gear 82. The fourth clutch member 50 includes an outer circumferential portion that includes at least one pawl. The inner circumferential portion of the sixth gear 82 includes at least one ratchet tooth. Engagement of the pawl of the fourth clutch member 50 with the ratchet tooth of the sixth gear 82 restricts rotation of the sixth gear 82. Separation of the pawl of the fourth clutch member 50 from the sixth gear 82 allows rotation of the sixth gear 82.

The first gear 62 and the second gear 74 of each of the first stepped gears 60 are capable of changing the speed of rotation transmitted from at least one of the crank axle 26 and the motor 28. Movement of the clutch ring 44A changes the combination of gears the rotation of which is restricted in accordance with a rotation phase of the sleeve 42 when the sleeve 42 rotates. The changes in the combination of gears, the rotation of which is restricted, change the rotation state of each element of the planetary gear mechanism 52. Thus, the operation of the control mechanism 40 changes the gear ratio of the gear change mechanism 36.

FIG. 7 shows the relationship between each gear and each element of the gear change mechanism 36. The gear change mechanism 36 includes gears corresponding to eight speeds. The first gear has the smallest gear ratio. The eighth gear has the largest gear ratio. In FIG. 7, the elements marked with "○" are included in the rotation transmission line of the corresponding gear.

In the first to fourth gears, rotation of the input portion 34 is first transmitted to the eleventh gear 98. In the fifth to eighth gears, rotation of the input portion 34 is first transmitted to the carrier 100. In the first and fifth gears, rotation of the carrier 100 is transmitted to the hub shell 32 through the first one-way clutch 38A. In the second to fourth and sixth to eighth gears, rotation of the fourth gear 78 is transmitted to the output portions 32A through the second one-way clutch 38B.

Referring to FIG. 3, while the gear change mechanism 36 is set to the third or seventh gear, when the crank arms 12 are forwardly rotated to rotate the rear sprocket 18, the first gear 62 rotates in a first direction R1, whereas the second gear 74 does not rotate relative to the support axle 22. In this case, the first gear 62 engages with the second gear 74 so that the first surface 64A contacts the third surface 76A. The degree of the first pressure angle A1 and the third pressure angle A3 is a factor that affects the Hertzian contact stress and the slip ratio when one of the first teeth 64 is engaged with one of the second teeth 76. Increases in the first pressure angle A1 and the third pressure angle A3 decrease the Hertzian contact stress thereby increasing the load capacity of the first teeth 64 and the second teeth 76. Additionally, increases in the first pressure angle A1 and the third pressure angle A3 decrease the slip ratio thereby increasing the transmission efficiency of the first gear 62 and the second gear 74.

The degree of the pressure angles A1 to A4 is a factor that affects the thickness of the first teeth 64 and the thickness of the second teeth 76. When the second pressure angle A2 and the fourth pressure angle A4 are set to be smaller than the first pressure angle A1 and the third pressure angle A3, the first teeth 64 and the second teeth 76 can be relatively thickened compared to when the second pressure angle A2 and the fourth pressure angle A4 are set to be equal to the first pressure angle A1 and the third pressure angle A3. Thus, even when the teeth 64 and 76 are small, the teeth 64 and 76 have strength that is in a prescribed acceptable range.

Referring to FIG. 4, while the gear change mechanism 36 is set to a gear other than the second to fourth and sixth to eighth gears, when the crank arms 12 are forwardly rotated to rotate the rear sprocket 18, the third gear 66 rotates in the first direction R1 and the fourth gear 78 rotates in the first direction R1. In this case, the third gear 66 engages with the fourth gear 78 so that the fifth surfaces 68A contact the seventh surfaces 80A.

Referring to FIG. 5, while the gear change mechanism 36 is set to the second or sixth gear, when the crank arms 12 are forwardly rotated to rotate the rear sprocket 18, the fifth gear 70 rotates in the first direction R1, whereas the sixth gear 82 does not rotate relative to the support axle 22. In this case, the fifth gear 70 engages with the sixth gear 82 so that the ninth surface 72A contacts the eleventh surface 84A.

Referring to FIG. 6, while the gear change mechanism 36 is set to the fourth or eighth gear, when the crank arms 12 are forwardly rotated to rotate the rear sprocket 18, the third gear 66 rotates in the first direction R1, whereas the seventh gear 86 does not rotate relative to the support axle 22. In this case, the third gear 66 engages with the seventh gear 86 so that the fifth surface 68A contacts the thirteenth surface 88A.

The present embodiment has the advantages described below.

(1) The first pressure angle A1, which is defined by the first surface 64A of each of the first teeth 64, is larger than the second pressure angle A2, which is defined by the second surface 64B of each of the first teeth 64. The third pressure angle A3, which is defined by the third surface 76A of each of the second teeth 76, is larger than the fourth pressure angle A4, which is defined by the fourth surface 76B of each of the second teeth 76. Hence, the first teeth 64 and the second teeth 76 are each asymmetrical. This increases the load capacity of the first teeth 64 and the second teeth 76 thereby allowing for miniaturization of the first gear 62 and the second gear 74 and miniaturization of the gear change mechanism 36 and ultimately miniaturization of the hub 30.

(2) The gear change mechanism 36 includes the first stepped gears 60 as planetary gears. Each of the stepped gears 60 includes the third gear 66 and the first gear 62. The third gear 66 engages both the seventh gear 86, which is a sun gear, and the fourth gear 78, which is a ring gear. The first gear 62 engages only the second gear 74, which is a sun gear. In the third gear 66, one surface of the third teeth 68 contacts a surface of the seventh gear 86 and another surface of the third teeth 68 contacts a surface of the fourth gear 78. Thus, it is preferred that the third gear 66 include symmetrical third teeth 68. In the first gear 62, only one surface of the first teeth 64 contacts a surface of the second gear 74. Thus, the first teeth 64 can be asymmetrical. This allows for miniaturization of the first gear 62 and miniaturization of the first stepped gear 60.

Second Embodiment

A second embodiment of a gear change mechanism 36A differs from the first embodiment of the gear change mechanism 36 in points described below and has substantially the same structure as the first embodiment of the gear change mechanism 36 in the remaining points.

Figure 8:
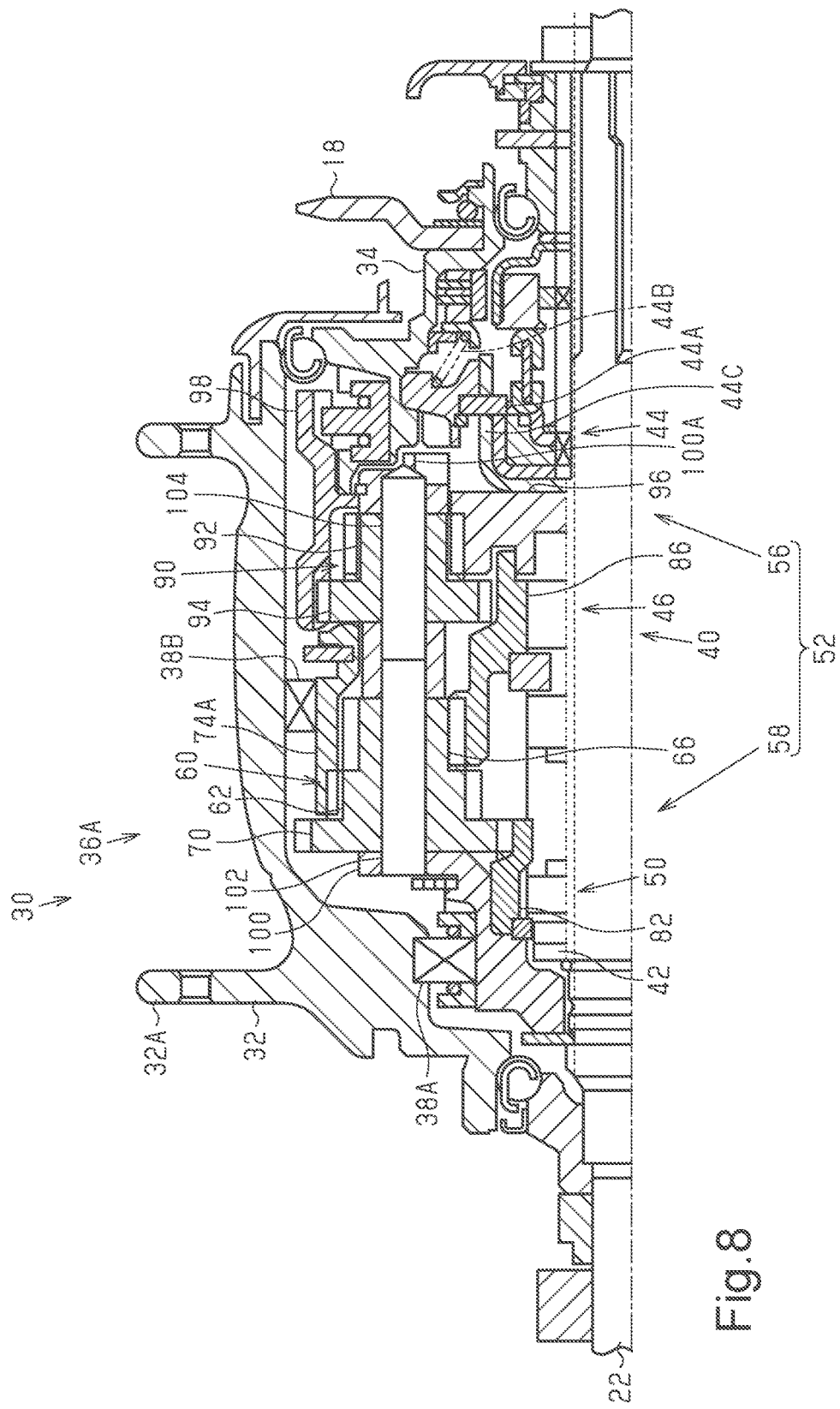
FIG. 8 is a half cross-sectional view of a bicycle gear change mechanism in accordance with a second embodiment.

FIG. 8 is a cross-sectional view showing the gear change mechanism 36A of the second embodiment. The gear change mechanism 36A includes a third planetary gear mechanism 58 instead of the first planetary gear mechanism 54. The third planetary gear mechanism 58 differs from the first planetary gear mechanism 54 in the following points. The third planetary gear mechanism 58 does not include the second gear 74 and the fourth gear 78. The third planetary gear mechanism 58 includes a twelfth gear 74A, which forms a ring gear and engages with the first gear 62. The twelfth gear 74A includes an outer circumferential portion, which is coupled to the hub shell 32 by the second one-way clutch 38B. In the same manner as the first gear 62 and the second gear 74 of the first embodiment, the first gear 62 and the twelfth gear 74A include asymmetrical teeth, which engage with each other.

Third Embodiment

A third embodiment of a gear change mechanism 36B differs from the first embodiment of the gear change mechanism 36 in points described below and has substantially the same structure as the first embodiment of the gear change mechanism 36 in the remaining points.

Figure 9:
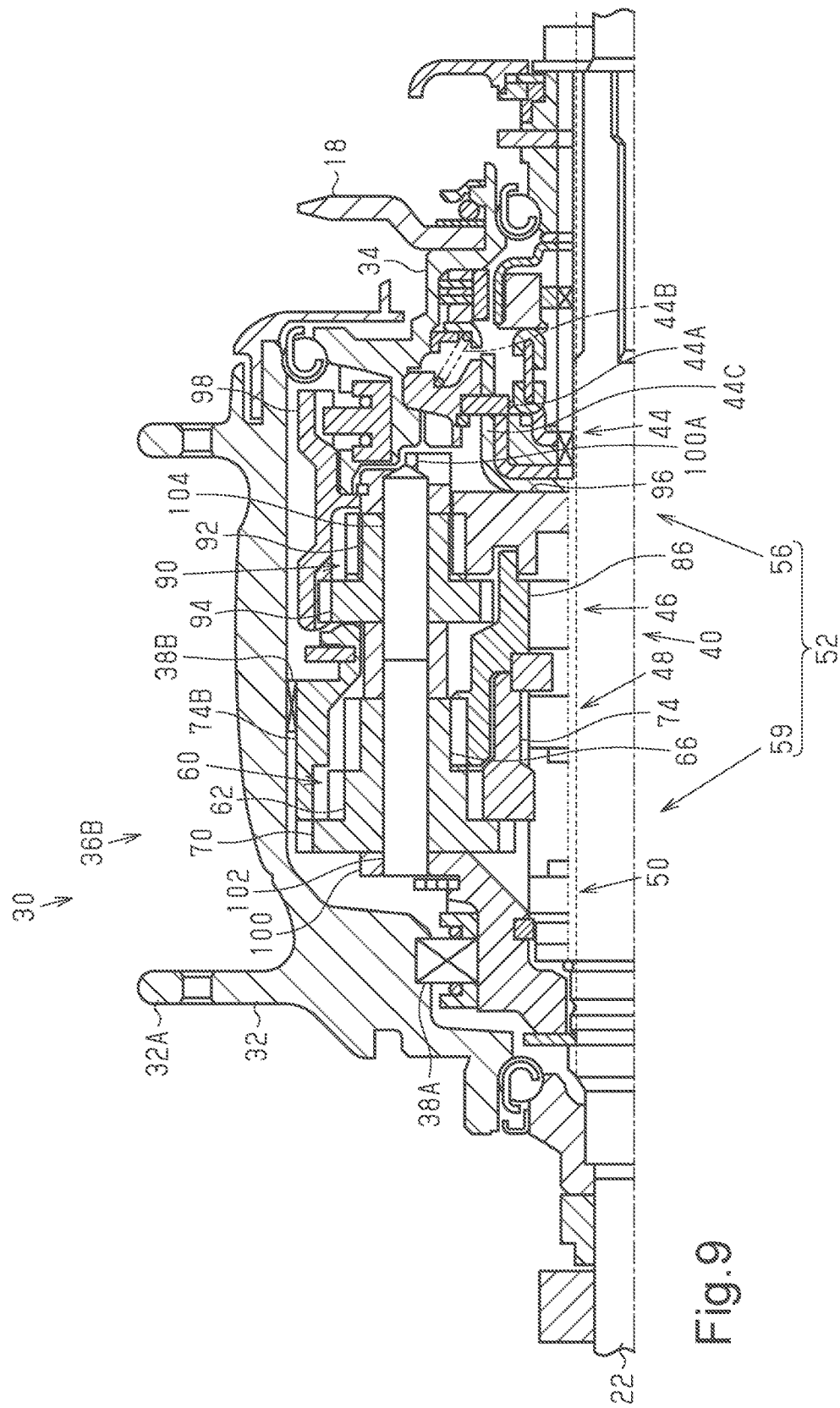
FIG. 9 is a half cross-sectional view of a bicycle gear change mechanism in accordance with a third embodiment.

FIG. 9 is a cross-sectional view showing the gear change mechanism 36B of the third embodiment. The gear change mechanism 36B includes a fourth planetary gear mechanism 59 instead of the first planetary gear mechanism 54. The fourth planetary gear mechanism 59 differs from the first planetary gear mechanism 54 in the following points. The fourth planetary gear mechanism 59 does not include the fourth gear 78 and the sixth gear 82. The fourth planetary gear mechanism 59 includes a thirteenth gear 74B, which forms a first ring gear and engages with the fifth gear 70. The thirteenth gear 74B includes an outer circumferential portion that is coupled to the hub shell 32 by the second one-way clutch 38B. In the same manner as the first gear 62 and the second gear 74 of the first embodiment, the fifth gear 70 and the thirteenth gear 74B include asymmetrical teeth, which engage with each other.

MODIFIED EXAMPLES

The above description is intended to be illustrative, and not restrictive. The bicycle gear change mechanism according to the present disclosure can be modified as follows. Further, two or more of the modified examples can be combined.

Figure 10:
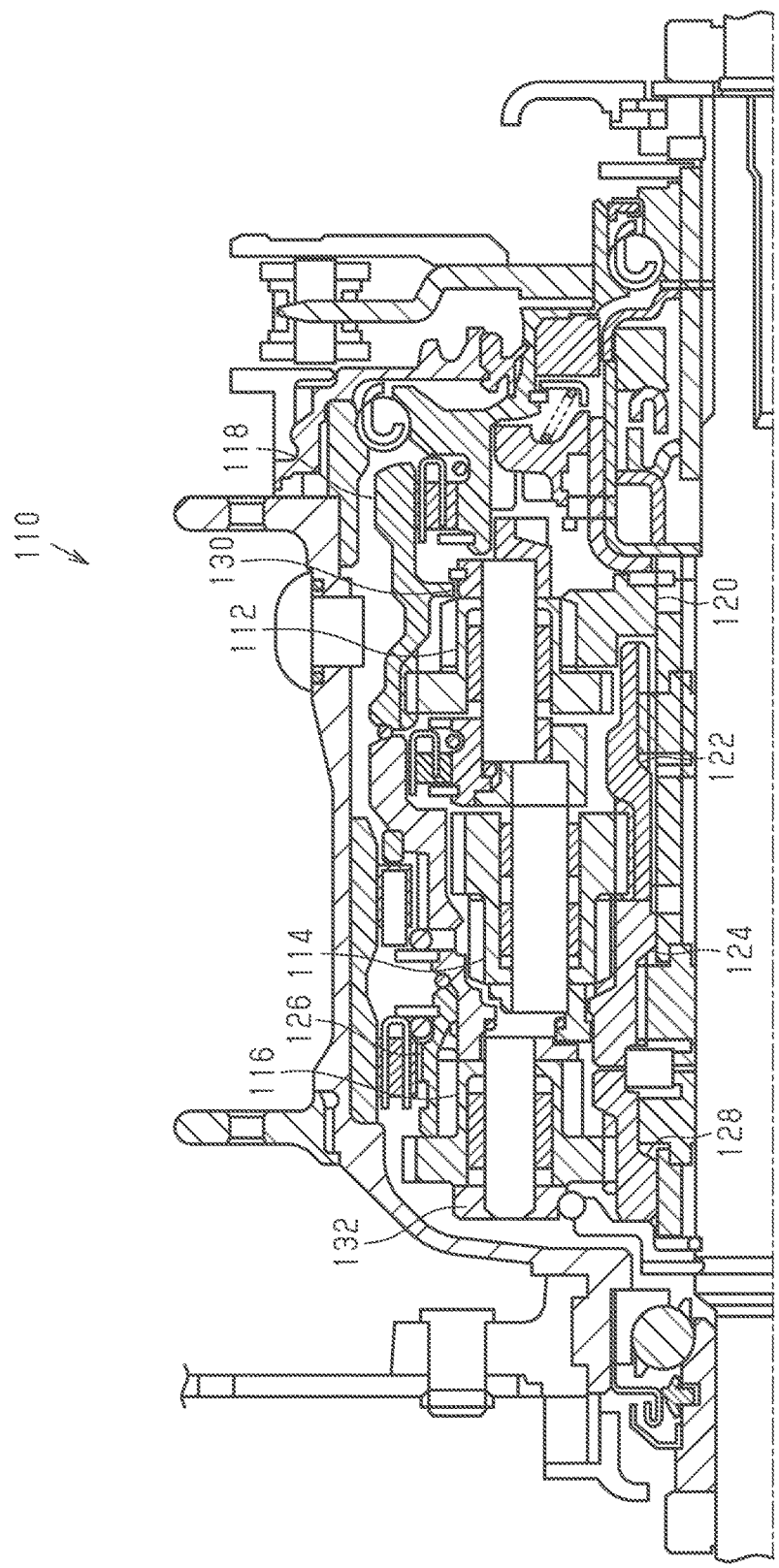
FIG. 10 is a half cross-sectional view of a bicycle gear change mechanism in accordance with a modified example.

The gear change mechanism can have any structure. In one example, the bicycle 10 can include a gear change mechanism 110 shown in FIG. 10 instead of the gear change mechanism 36. The gear change mechanism 110 includes gears corresponding to eleven speeds. The gear change mechanism 110 includes a twenty-first stepped gear 112, a twenty-second stepped gear 114, a twenty-third stepped gear 116, a twenty-first gear 118, a twenty-second gear 120, a twenty-third gear 122, a twenty-fourth gear 124, a twenty-fifth gear 126, a twenty-sixth gear 128, a second carrier 130 and a third carrier 132. The twenty-first stepped gear 112, the twenty-second stepped gear 114 and the twenty-third stepped gear 116 form planetary gears of a planetary gear mechanism. The twenty-first stepped gear 112, the twenty-second stepped gear 114, and the twenty-third stepped gear 116 are each a two-step gear. The twenty-first gear 118 and the twenty-fifth gear 126 form ring gears of the planetary gear mechanism. The twenty-second gear 120, the twenty-third gear 122, the twenty-fourth gear 124, and the twenty-sixth gear 128 form sun gears of the planetary gear mechanism. One gear of the twenty-first stepped gear 112 engages with the twenty-first gear 118. The other gear of the twenty-first stepped gear 112 engages with the twenty-second gear 120. One gear of the twenty-second stepped gear 114 engages with the twenty-third gear 122. The other gear of the twenty-second stepped gear 114 engages with the twenty-fourth gear 124. One gear of the twenty-third stepped gear 116 engages with the twenty-fifth gear 126. The other gear of the twenty-third stepped gear 116 engages with the twenty-sixth gear 128.

Each gear of the twenty-first stepped gear 112, the twenty-first gear 118, and the twenty-second gear 120 each include asymmetrical teeth. The other gear of the twenty-second stepped gear 114 and the twenty-fourth gear 124 each include asymmetrical teeth. Each gear of the twenty-third stepped gear 116, the twenty-fifth gear 126, and the twenty-sixth gear 128 each include asymmetrical teeth in the same manner as the first gear 62 and the second gear 74 of the first embodiment.

The gear change mechanism 36 can be included in any kind of bicycle component. In one example, the drive unit 24 can include the gear change mechanism 36.

The stepped gear can have any number of gears. Although each of the first stepped gears 60 includes three gears, the first stepped gear 60 can include two gears or four or more gears. In this case, at least only one of the gears needs to include asymmetrical teeth.

In the gear change mechanism of each embodiment, each gear of the second planetary gear mechanism 56 can include asymmetrical teeth in the same manner as the first planetary gear mechanism 54.

In the above embodiments, the gear change mechanisms include gears corresponding to six speeds, eight speeds, or eleven speeds. However, the present disclosure can be applied as long as a gear change mechanism changes the speed with multiple gears through a planetary gear mechanism.

In each of the above embodiments, the gear change mechanism is formed by the planetary gear mechanism. Instead, the gear change mechanism can be formed by gears that are rotatable about a first rotational axis and gears that are rotatable about a second rotational axis, and engage the gears rotatable about the first rotational axis. The first rotational axis is parallel to the second rotational axis.

In each of the above embodiments, the gear change mechanism includes multiple gears. Instead, a speed reduction mechanism or a speed increase mechanism that does not include gears can be used.

In each of the above embodiments, each gear forming the gear change mechanism can be a helical gear instead of a spur gear.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward". "rearward", "front", "rear". "up". "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle component. Accordingly, these directional terms, as utilized to describe the bicycle component should be interpreted relative to a bicycle in an upright riding position on a horizontal surface and that is equipped with the bicycle component. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle gear change mechanism comprising:
   a first gear including first teeth, each of which includes a first surface and a second surface, the first surface defining a first pressure angle, the second surface defining a second pressure angle, and the first pressure angle differing from the second pressure angle; and
   a second gear including second teeth, each of which includes a third surface and a fourth surface, the third surface defining a third pressure angle, the fourth surface defining a fourth pressure angle, the third pressure angle differing from the fourth pressure angle, and the second gear being engaged with the first gear,
   each of the first pressure angle and the third pressure angle being twenty degrees or greater, and
   each of the second pressure angle and the fourth pressure angle being less than twenty degrees.

2. The bicycle gear change mechanism according to claim 1, wherein
   the first pressure angle is larger than the second pressure angle,
   the third pressure angle is larger than the fourth pressure angle, and
   the first gear engages with the second gear so that the first surface contacts the third surface.

3. The bicycle gear change mechanism according to claim 1, wherein
   the first gear and the second gear are spur gears.

4. The bicycle gear change mechanism according to claim 1, further comprising:
   a third gear including third teeth, each of which includes a fifth surface and a sixth surface, the fifth surface defining a fifth pressure angle, the sixth surface defining a sixth pressure angle, the fifth pressure angle being equal to the sixth pressure angle, and the third gear being configured to rotate integrally with the first gear; and a fourth gear including fourth teeth, each of which includes a seventh surface and an eighth surface, the seventh surface defining a seventh pressure angle, the eighth surface defining an eighth pressure angle, the seventh pressure angle being equal to the eighth pressure angle, arid the fourth gear being engaged with the third gear.

5. The bicycle gear change mechanism according to claim 4, wherein the first gear is formed integrally the third gear.

6. The bicycle gear change mechanism according to claim 4, wherein the first of the first gear differ in number from the third teeth of the third gear.

7. The bicycle gear change mechanism according to claim 1, further comprising:

a fifth gear including fifth teeth, each of which includes a ninth surface and a tenth surface, the ninth surface defining a ninth pressure angle, the tenth surface defining a tenth pressure angle, the ninth pressure angle differing from the tenth pressure angle, and the fifth gear being configured to rotate integrally with the first gear; and a sixth gear including sixth teeth, each of which includes an eleventh surface and a twelfth surface, the eleventh surface defining an eleventh pressure angle, the twelfth surface defining a twelfth pressure angle, the eleventh surface differing from the twelfth pressure angle, and the sixth gear being engaged with the fifth gear.

8. The bicycle gear change mechanism according to claim 7, wherein the ninth pressure angle is larger than the tenth pressure angle, the eleventh pressure angle is larger the twelfth pressure angle, and the fifth gear engages with the sixth gear so that the ninth surface contacts the eleventh surface.

9. The bicycle gear change mechanism according to claim 7, wherein the first gear is formed integrally with the fifth gear.

10. The bicycle gear change mechanism according to claim 7, wherein the first teeth of the first gear differ in number from the fifth teeth of the fifth gear.

11. The bicycle gear change mechanism according to claim 10, further comprising:

a third gear including third teeth, each of which includes a fifth surface and a sixth surface, the fifth surface defining a fifth pressure angle, the sixth surface defining a sixth pressure angle, the fifth pressure angle being equal to the sixth pressure angle, and the third gear being configured to rotate integrally with the first gear; and a fourth gear including fourth teeth, each of which includes a seventh surface and an eighth surface, the seventh surface defining a seventh pressure angle, the eighth surface defining an eighth pressure angle, the seventh pressure angle being equal to the eighth pressure angle, and the fourth gear being engaged with the third gear, and the third teeth of the third gear differing in number from the fifth teeth of the fifth gear.

12. The bicycle gear change mechanism according to claim 1, wherein the first gear and the second gear are included in a first planetary gear mechanism, the first gear forms a first planetary gear, and the second gear forms one of a first sun gear and a first ring gear.

13. The bicycle gear change mechanism according to claim 12, further comprising:

a third gear including third teeth, each of which includes a fifth surface and a sixth surface, the fifth surface defining a fifth pressure angle, the sixth surface defining a sixth pressure angle, the fifth pressure angle being equal to the sixth pressure angle, and the third gear being configured to rotate integrally with the first gear; and a fourth gear including fourth teeth, each of which includes a seventh surface and an eighth surface, the seventh surface defining a seventh pressure angle, the eighth surface defining an eighth pressure angle, the seventh pressure angle being equal to the eighth pressure angle, and the fourth gear being engaged with the third gear, and the third gear and the fourth gear being included in the first planetary gear mechanism, the third gear forms a second planetary gear, and the fourth gear forms the other one of the first sun gear and the first ring gear.

14. The bicycle gear change mechanism according to claim 12, further comprising:

a fifth gear including fifth teeth, each of which includes a ninth surface and a tenth surface, the ninth surface defining a ninth pressure angle, the tenth surface defining a tenth pressure angle, the ninth pressure angle differing from the tenth pressure angle, and the fifth gear being configured to rotate integrally with the first gear; and a sixth gear including sixth teeth, each of which includes an eleventh surface and a twelfth surface, the eleventh surface defining an eleventh pressure angle, the twelfth surface defining a twelfth pressure angle, the eleventh surface differing from the twelfth pressure angle, and the sixth gear being engaged with the fifth gear, the fifth gear and the sixth gear being included in the first planetary gear mechanism, the fifth gear forms a third planetary gear, and the sixth gear forms one of a second sun gear and a second ring gear.

15. A bicycle gear change mechanism comprising:

a first gear including first teeth, each of which includes a first surface and a second surface, the first surface defining a first pressure angle, the second surface defining a second pressure angle, and the first pressure angle differing from the second pressure angle;

a second gear including second teeth, each of which includes a third surface and a fourth surface, the third surface defining a third pressure angle, the fourth surface defining a fourth pressure angle, the third pressure angle differing from the fourth pressure angle, and the second gear being engaged with the first gear;

a third gear including third teeth, each of which includes a fifth surface and a sixth surface, the fifth surface defining a fifth pressure angle, the sixth surface defining a sixth pressure angle, the fifth pressure angle being equal to the sixth pressure angle, and the third gear being configured to rotate integrally with the first gear;

a fourth gear including fourth teeth, each of which includes a seventh surface and an eighth surface, the seventh surface defining a seventh pressure angle, the eighth surface defining an eighth pressure angle, the seventh pressure angle being equal to the eighth pressure angle, and the fourth gear being engaged with the third gear;

a seventh gear including seventh teeth, each of which includes a thirteenth surface and a fourteenth surface, the thirteenth surface defining a thirteenth pressure angle, the fourteenth surface defining a fourteenth pressure angle, the thirteenth pressure angle being equal to the fourteenth pressure angle, the seventh gear being engaged with the third gear;

a support axle supporting the second gear and the seventh gear; and a control mechanism configured to control rotation of the second gear and the seventh gear relative to the support axle, the first gear and the second gear being included in a first planetary gear mechanism with the first gear forming a first planetary gear and the second gear forming a first sun gear, and the seventh gear being included in the first planetary gear mechanism and forms a third sun gear.

16. The bicycle gear change mechanism according to claim 12, further comprising
a second planetary gear mechanism coupled to the first planetary gear mechanism.

17. The bicycle gear change mechanism according to claim 1, wherein
the first pressure angle and the third pressure angle are each thirty degrees or greater, and
the second pressure angle and the fourth pressure angle are each less than seventeen degrees.

18. The bicycle gear change mechanism according to claim 1, wherein
the first gear and the second gear change a speed of rotation transmitted from at least one of a crank axle and a motor.

19. The bicycle gear change mechanism according to claim 1 that forms a hub gear arranged at a hub of a rear wheel.

20. A stepped gear comprising:
a first gear including first teeth each of which includes a first surface and a second surface, the first surface defining a first pressure angle, the second surface defining a second pressure angle, the first pressure angle differing from the second pressure angle, the first pressure angle being equal to or larger than twenty degrees, and the second pressure angle being smaller than twenty degrees; and
a third gear including third teeth each of which includes a fifth surface and a sixth surface, the fifth surface defining a fifth pressure angle, the sixth surface defining a sixth pressure angle, the fifth pressure angle being equal to the sixth pressure angle, and the third gear being integral with the first gear.

21. The stepped gear according to claim 20, wherein
the first teeth of the first gear differ in number from the third teeth of the third gear.

* * * * *